J. Honecker.

Boot and Shoe Top.

N°. 90,763. Patented Jan. 1, 1869.

Witnesses
L. Hailer
G. T. Dodge

Inventor.
J. Honecker
by Dodge & Munn
his Att.

United States Patent Office.

JOHN HONECKER, OF COLUMBUS, OHIO.

Letters Patent No. 90,753, dated June 1, 1869.

---

IMPROVEMENT IN BOOT AND SHOE-TOPS.

---

The Schedule referred to in these Letters Patent and making part of the same.

---

*To all whom it may concern:*

Be it known that I, JOHN HONECKER, of Columbus, in the county of Franklin, and State of Ohio, have invented certain new and useful Improvements in Articles of Manufacture for Boot and Shoe-Tops; and I do hereby declare that the following is a full, clear, and exact description thereof, reference being had to the accompanying drawings, making part of this specification, and to the letters of reference marked thereon, like letters indicating like parts, wherever they occur.

To enable others skilled in the art, to construct and use my invention, I will proceed to describe it.

My invention relates to improvements in boot and shoe-tops; and consists in the production of a new article of manufacture, to be used in making the tops of boots and shoes highly ornamental, and to be put on the market as a new article in the trade.

In the drawings—

In the manufacture of fancy or dress-boots and shoes it is often very desirable to have their tops highly ornamental. In small shops these can only be produced at great expense, for want of the requisite tools and conveniences for manufacturing them.

The object of my invention is to produce these ornamented top-pieces as new articles of manufacture, and put them into the market, so that small manufacturers may obtain them at less cost than they could make them.

Figure 1:
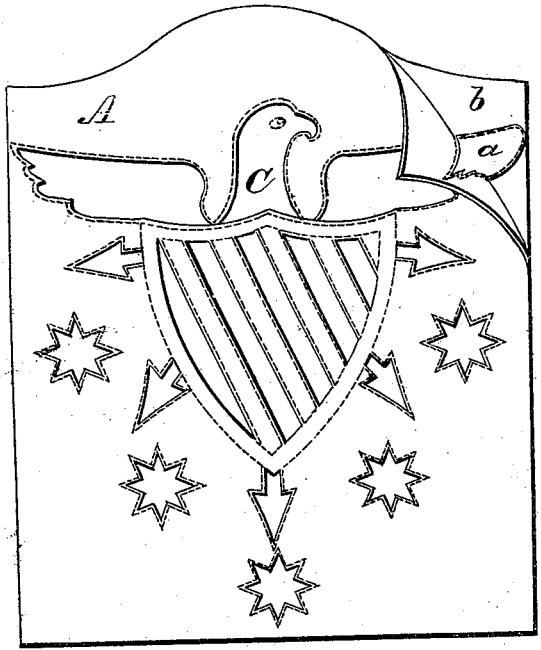
Figure 1 represents one of my articles, intended for topping out a boot-top or leg, and opened a little at one corner, to show the manner of its construction.
Figure 3:
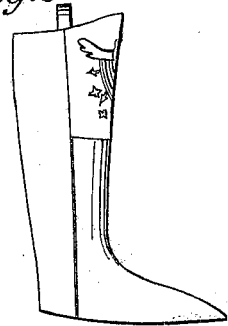
Figure 3 represents the manner of applying one of these articles.
Figure 2:
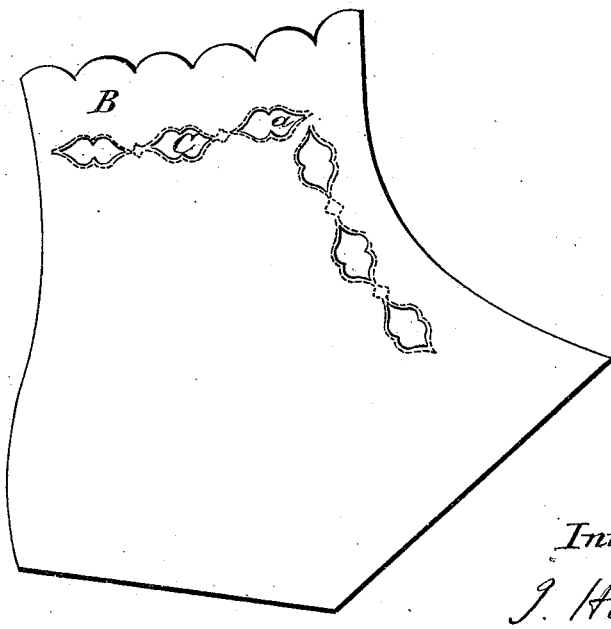
Figure 2 represents a similar article for topping out a shoe.

In manufacturing these top-pieces, I take a piece of any kind of leather suitable for the purpose, and of any desired color, and cut out a top-piece, A, for boots, as shown in fig. 1, or top-piece, B, for shoes, as shown in fig. 2.

I then cut or punch, by means of dies, operated by suitable mechanism, these pieces, so as to leave an open or perforated figure, C, as shown in fig. 1, or one as shown in fig. 2.

These figures may be made to represent any design to suit the fancy, as monograms, trade-marks, escutcheons, society badges, mechanical occupations, &c.

To complete the figure or design, I place on the under side of the perforations leather $a$, of any suitable kind and color, to bring out the figure distinctly, as shown in fig. 1. These may be fastened temporarily with paste or other material, and when thus fastened in place, I line the whole with any suitable fabric, $b$, either of linen, cotton, or light leather, and fasten the whole together by running lines of stitching around the borders of the perforated figures, as clearly shown in both figures.

As nearly the whole of these ornamentations may be done by use of machines, it is evident that these top-pieces can be manufactured at comparatively small cost, and be put upon the market at rates that will enable small manufacturers to purchase and work them up into boots and shoes of a highly ornamental character.

Having thus described my invention,

What I claim, is—

As a new article of manufacture, top-pieces for boots and shoes, perforated by suitable dies and machinery, to represent any desired figure, and ornamented in the manner shown, by placing under said perforations pieces of leather of the same or different colors, and lining and stitching the whole together, as described and for the purpose set forth.

JOHN HONECKER.

Witnesses:
N. MESION,
J. J. HOFFMANN.